Nov. 2, 1965 A. A. VALDETTARO ETAL 3,214,826

METHOD OF FORMING A ROTARY INDUCTANCE SWITCH

Original Filed Oct. 3, 1958 3 Sheets-Sheet 1

INVENTORS:
ALARICO A. VALDETTARO
JOE G. BADGER
BY STANLEY R. MEADOWS

Mason, Kolehmainen, Rathburn & Wyss
Att'ys.

INVENTORS:
ALARICO A. VALDETTARO
JOE G. BADGER
BY STANLEY R. MEADOWS
Mason, Kolehmainen, Rathburn & Wyss
Att'ys.

METHOD OF FORMING A ROTARY INDUCTANCE SWITCH

Original Filed Oct. 3, 1958 3 Sheets-Sheet 3

INVENTORS:
ALARICO A. VALDETTARO
JOE G. BADGER
BY STANLEY R. MEADOWS
Mason, Kolehmainen, Rathburn & Wyss
Att'ys.

United States Patent Office 3,214,826
Patented Nov. 2, 1965

3,214,826

METHOD OF FORMING A ROTARY INDUCTANCE SWITCH

Alarico A. Valdettaro, Joe G. Badger, and Stanley R. Meadows, Bloomington, Ind., assignors to Sarkes Tarzian, Inc., Bloomington, Ind., a corporation of Indiana
Original application Oct. 3, 1958, Ser. No. 765,138. Divided and this application Mar. 6, 1961, Ser. No. 93,700
4 Claims. (Cl. 29—155.55)

The present invention relates to electrical switches and it more particularly relates to multiple contact rotary switches in which a common rotary contact member selectively engages each of a plurality of circumferentially disposed contact segments. Specifically, this application is a division of a prior application, Serial No. 765,138, filed October 3, 1958, now abandoned, and its continuation application Serial No. 337,038, filed January 10, 1964, both of said applications being assigned to the same assignee as the present invention.

Multiple contact rotary switches are commonly used in television tuners for selectively switching each of a plurality of incremental inductances into the various states thereof. Because of the current emphasis which is being placed on the portability of radio and television receivers, it is important that the rotary switches used in television or other high frequency tuners be small and compact. However, such a requirement ordinarily increased the assembly cost of the switch, and therefore, it would be desirable to provide a rotary switch which is particularly suited for use in television tuners, which is small in size and reliable in operation, and which can be readily assembled by automatic or semiautomatic machinery to minimize the assembly time and cost thereof.

Therefore, an object of the present invention is to provide a new and improved rotary switch.

Another object of the present invention is to provide a new and improved multiple contact rotary switch which is suitable for use in television tuners.

A further object of the present invention is to provide a new and improved rotary switch which employs a minimum of parts requiring individual assembly.

Another object of the present invention is to provide a new and improved rotary switch which is so constructed as to insure reliable operation thereof with a minimum of maintenance.

Another object of the present invention is to provide a new and improved method of assembling a multiple contact rotary switch.

The invention both as to its organization and method of operation, together with further objects and advantages thereof, will best be understood by reference to the following description taken in connection with the accompanying drawings, in which.

Figure 1:
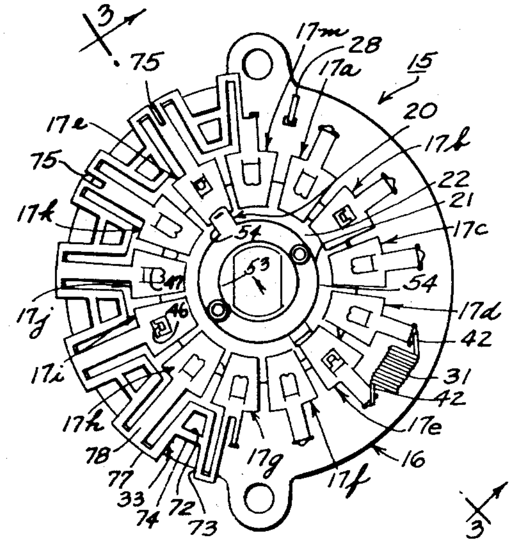
FIG. 1 is a front view of a multiple contact rotary switch embodying the present invention.
Figure 2:
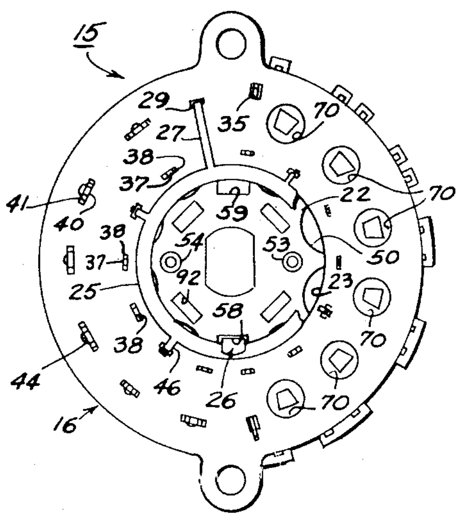
FIG. 2 is a rear view of the switch shown in FIG. 1.
Figure 3:
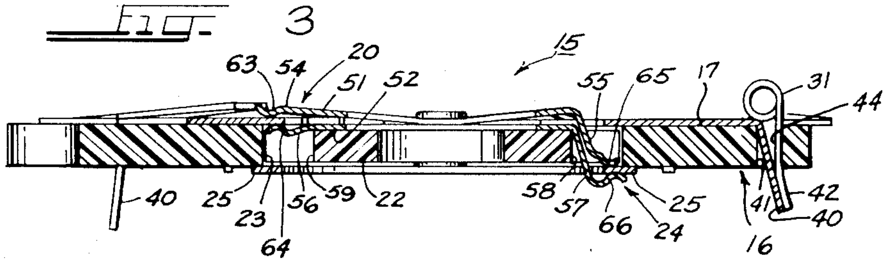
FIG. 3 is a sectional view of the device of FIG. 1 taken along the line 3—3 thereof.

Referring now to the drawings and particularly to FIGS. 1–3 thereof, there is shown a multiple contact rotary switch 15 comprising a stator wafer 16 having a central aperture 23 in which a rotor 22 is rotatably mounted. The wafer 16 is formed of any suitable insulating material such as a phenolic resin, and a plurality of contact segments 17, respectively designated 17*a*, 17*b*, 17*c*, 17*d*, 17*e*, 17*f*, 17*g*, 17*h*, 17*i*, 17*j*, 17*k*, 17*l*, 17*m*, are secured to the front face thereof in equally spaced positions about the aperture 23. The rotor 22 is held in the aperture 23 by means of the inner portions of the contact segments 17 and a conductive ring 25 mounted on the back face of the wafer 16. The ring 25 is secured to the wafer 16 by a plurality of radially extending fingers 46 having off-turned ends which are staked in slots 38 disposed opposite the locations of the apertures 47 formed in the segments 17 when the tongues 37 are struck out. The contact segments 17 are radially disposed on the stator 16, and as best shown in FIG. 3, partially extend over the front face of the rotor 22. Similarly, the ring 25 partially extends over the rear face of the rotor 22.

The ring 25 provides the common terminal for the switch 15 and is selectively connected to the contact segments 17 by means of a rotor contact 21 which includes a first set of wiper contacts 20 and a second set of wiper contacts 24. The contacts 20 selectively engage the segments 17 and the contacts 24 continuously engage the ring 25 as the rotor 22 is rotated with respect to the stator 16 thereby to selectively connect a plurality of low channel inductance coils 31 and high channel inductance loops 33 into the tuner circuit incorporating the switch 15.

The contact segments 17 are staked in place on the stator wafer 16 by respective struck-out tongues 37 which extend through slotted aperture 38 in the wafer. The ends of tongues 37 are bifurcated and the bifurcations are bent over the rear face of the wafer 16 thereby to prevent spurious removal of the segments 17 from the wafer 16. Connection of the coils 31 to the segments 17*b*–17*g* is facilitated by off-turned tabs 40 which extend through slotted apertures 41 in the wafer 16. The apertures 41 each include an arcuate portion 44 through which the leads 42 on the inductance extend, and a good contact between the leads 42 and the tabs 40 is assured by the angular disposition of the tabs 40 over the hole portion 44 so that, as best shown in FIG. 3, as the leads 42 are inserted into the slots 41 they necessarily press against the tabs 40. More permanent connections between the coils 31 and the contact segments 17 are, of course, provided by thereafter soldering the leads 42 to the tabs 40, this being preferably effected in a dip-soldering process.

In order to insure a low ohmic connection between the ring 25 and the selected one of the contact segments 17, the rotor contact 21 comprises a pair of conductive spring plates 51 and 52 (FIG. 3) which each respectively comprises a pair of radially extending wiper contact elements 54, 55 and 56, 57. The contact elements 54, 56 respectively include arcuate end portions 63 and 64 which press against opposite sides of the segments 17, and the contact elements 55, 57 respectively include arcuate end portions 65 and 66 which press against opposite sides of the ring 25. As best shown in FIGS. 2 and 3, the rotor 22, which like the wafer 16 may be formed of any suitable insulating material such as a phenolic resin, is provided with a pair of clearance notches 58 and 59 for the wiper contacts 20 and 24. The double action of the wiper contacts 20 and 24 engaging opposite sides of the segments 17 and the ring 25 thus insures the reliable operation of the switch 15 even in a tuner having a misaligned shaft since cocking of the rotor 21 in the apertures 23 does not break the connections to either the segments 17 or the ring 25.

In order to reduce the capacitance value between the ring 25 and the segments 17 as well as to reduce the capacitance value between the segments 17, the rotor 21 is provided with a plurality of arcuate cutouts 50, best shown in FIG. 2. Since the major portion of the ring 25 extends over the rotor 21, and since the dielectric constant of the rotor material exceeds that of air, the removal of the rotor material from between the ring 25 and the segments 17 reduces this undesired capacitance.

The inductance increments 33 each comprise but a single loop and are best formed as integral parts of the contact segments 17*g*–17*m* between which they are connected. The inductance increments 33 on any one switch 15 are substantially identical and respectively include end portions 77 which connect the respective increment between radially extending arms 78 on the adjacent ones of the segments 17*g*–17*m*. The inductances 33 each further include a loop portion 73 and a cross arm shunting bar 74 coacting with the intermediate portion of the loop 73 to define an aperture 72, and a plurality of slots 75 may be provided in the outer ends of the contact segments 17*g*–17*m* to increase the inductance values of the increments 33. Since the inductances 33 are planar and the arms 78 are also planar and constitute a portion of the inductance between adjacent segments 17, a substantial range of inductance adjustment is provided by adjustably pivoting the loop 72 about the end portions 77, and a plurality of apertures 70 are provided in the wafer 16 directly beneath the loops 73 to enable adjustment of the high channel inductance increments from the rear side of the wafer 16.

Figure 6:
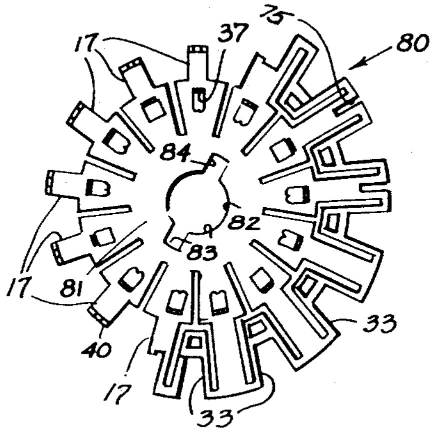
FIG. 6 is a rear view of a contact stamping used in the switch shown in FIG. 1.
Figure 7:
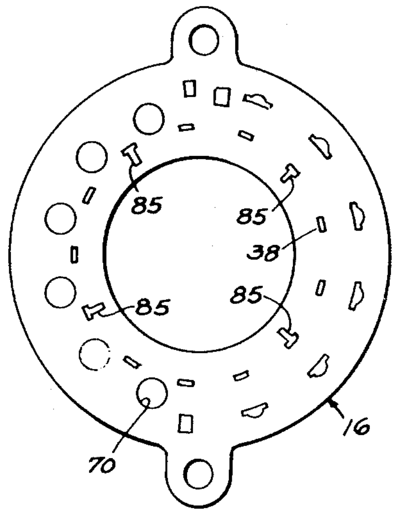
FIG. 7 is a stator wafer.
Figure 8:
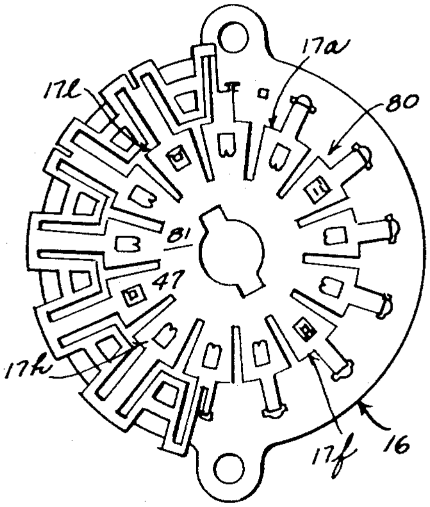
FIG. 8 is a front view showing the stamping of FIG. 5 assembled to the wafer of FIG. 6.

Referring now to FIGS. 6, 7 and 8, the segments may be formed and assembled to the stator wafer 16 to provide the unit of FIG. 8, and thereafter, the center portion of the unit 80 may be punched out to disconnect the segments 17 from one another. Considered in greater detail, the stamping 80 includes the contact segments 17, and the inductance increments 33 and in addition comprises a center portion 81 which interconnects the inner ends of the segments 17 thereby to render the stamping 80 a unitary member. Alignment of the stamping 80 on an assembly jig for connection to the stator wafer 16, best shown in FIG. 7, may be facilitated by providing the center portion 81 with a central keying aperture 82 including a pair of diametrically opposed notches 83 and 84.

Figure 9:
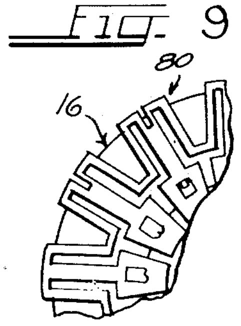
FIG. 9 is a fragmentary view of a contact stamping.
Figure 10:
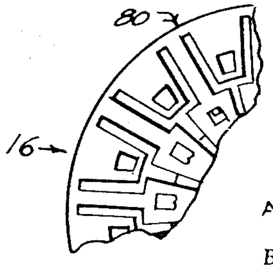
FIG. 10 is a fragmentary view of another contact stamping.

In manufacturing the switch 15, the stamping 80 is punched out of a metal sheet of suitable rigidity and conductivity, and the die which is employed for this purpose includes a plurality of first portions which punch out the apertures 72 and a plurality of second portions which punch out the remainder of the loop 73 to leave the cross arm 74. The second portions of the die are replaceable with portions of varying size to enable the stamping with a single die of a plurality of stampings 80 in which the inductance value of the increments 33 may be one of several substantially different values. Where a maximum value of inductance is required the second portions of the die are so large as to completely eliminate the cross arms 74 from the increments 33 and where the value of inductance required is a minimum the second portions are eliminated from the die so that the cross arms 74 extend from the apertures 72 to the periphery of the stamping 80. The former condition is illustrated in FIG. 9 and the latter condition is illustrated in FIG. 10.

Following the stamping operation, the stamping 80 and the stator wafer 16 are positioned on an assembly fixture and then placed in a press which simultaneously deforms the tongues 37 to stake the stamping 80 to the wafer 16 and bend the loops 73 into substantially the proper positions to provide the desired inductance values. Some slight further adjustment of the loops 72 may be made after the switch 15 has been assembled into a tuner. After the stamping 80 has thus been secured to the wafer 16, the center portion 81 of the stamping 80 is punched out thereby leaving the contact segments 17 disconnected from one another. The rotor 21 is then positioned in the central aperture 23 in the stator wafer 16 so that the contact set 20 engages opposite sides of the segments 17. Thereafter, the ring 25 is put in place on the wafer 16 with the fingers 46 extending through portions 85 of the appropriate ones of the slots 38 and the contact set 24 engaging opposite sides of the ring 25. The finger portions 46 are then deformed in a press to stake the ring 25 in place. The individual inductance increments 31 may now be added in the manner heretofore described and soldered to the appropriate ones of the segments 17*b*–17*g* in a dip-soldering process.

Figure 5:
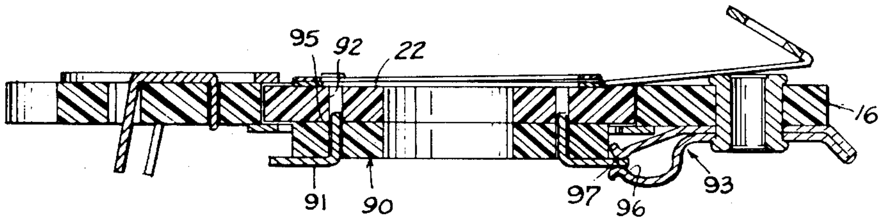
FIG. 5 is a cross sectional view taken along the line 5—5 of FIG. 4.
Figures 4, 11:
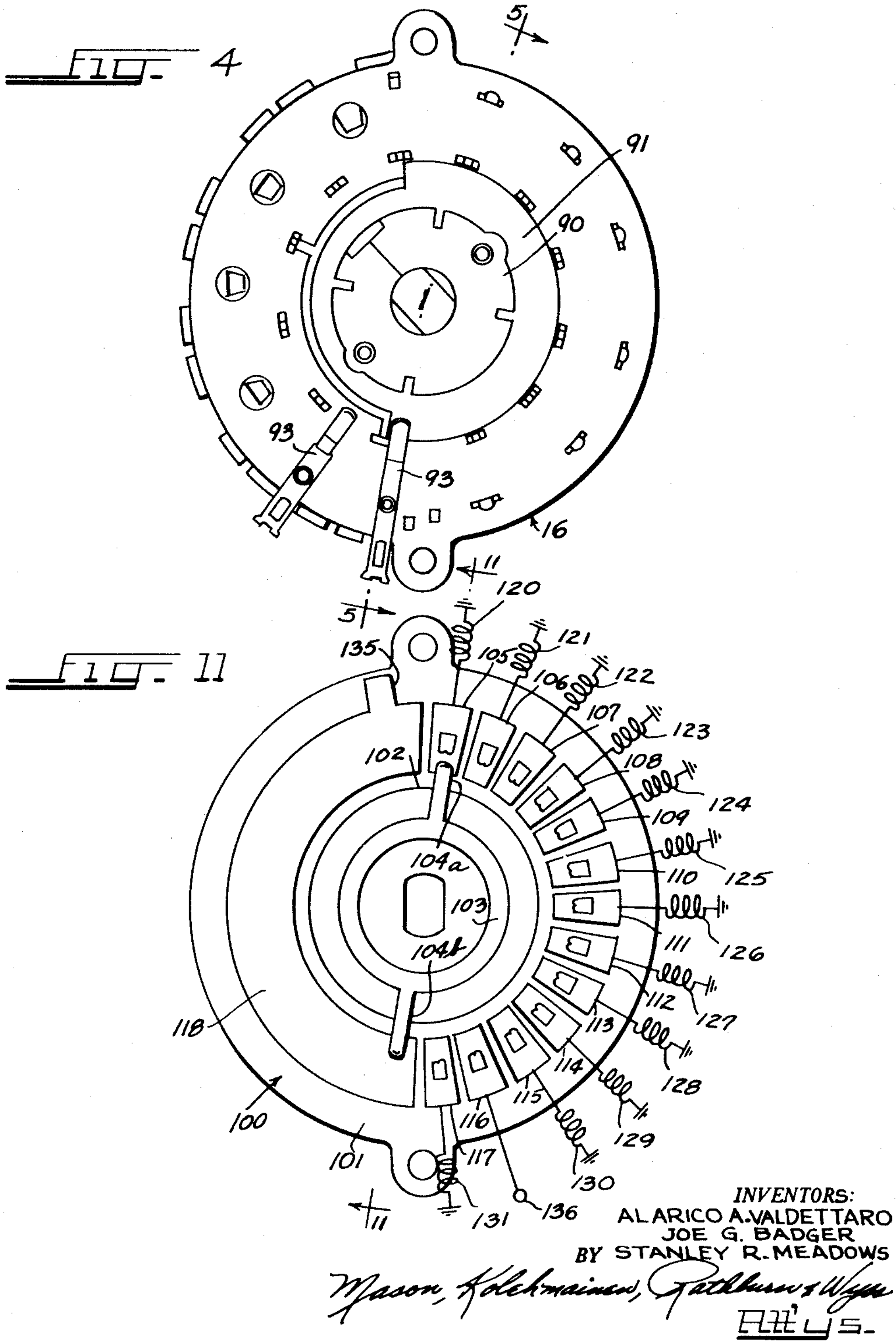
FIG. 4 is a rear view of an alternative embodiment of the switch shown in FIGS. 1 and 2.
FIG. 11 is a front view of another switch embodying certain features of the present invention.

Referring to FIGS. 4 and 5, television tuners ordinarily include an adjustably tuned circuit interconnected between the antenna and the RF amplifier, and in order to reduce any undesired interference between the high and low channel inductance increments which may be selectively connected into this circuit by the selector 15, there is provided in accordance with the present invention an additional set of contact segments 93. The segments 93 are mounted on the rear side of the wafer 16 and an auxiliary rotor 90 is mounted on the rear face of the rotor 22. A common contact ring 91 is mounted on the rear face of the auxiliary rotor 90 by means of a plurality of tabs 95 which are staked in suitable slots in the rotor 90. The ends of the tabs 95 are disposed in clearance slots 92 in the rotor 22. Inasmuch as the ends of the tabs 95 terminate a substantial distance from the upper or forward face of the rotor 92, they are insulated from the wiper ring 21. A plurality of the double-acting contacts 93 are secured to this stator wafer 16 by respective ones of a plurality of eyelets and include oppositely acting contact portions 96 and 97 which bear on opposite sides of the edge portions of the contact ring 91 which extends beyond the periphery of the rotor wafer 90.

Referring now to FIG. 11, there is shown the front view of a switch 100 which embodies the present invention and which has the advantage over the prior art switches of simplicity of construction since all operative portions of the switch are located on one side of an insulating support wafer 101. Since all operative parts of the switch 100 are on one side thereof, two such switches may be stacked back-to-back to minimize the space requirements of the two switches. The switch 100 is adapted for use in a tuner in which the channel selector shaft is movable into an odd number of discrete angular positions such, as in the case of a UHF-VHF tuner, which has thirteen positions, twelve VHF channel selecting positions and a thirteenth UHF selecting position. As shown, it comprises, in addition to the stator 101, a rotor 102 which is rotatably mounted in a central aperture in the stator 101 and which has disopsed thereon a conductive wiper ring 103 having a pair of radially extending diametrically opposed contact members 104*a* and 104*b* which are adapted to selectively engage a plurality of contact segments 105, 106, 107, 108, 109, 110, 111, 112, 113, 114, 115, 116, and 117 and a common arcuately shaped contact sector 118, the contact segments 105–117 and the contact sector 118 all being mounted on the front face of the stator wafer 101. Inasmuch as the switch 100 is a thirteen position switch there are thirteen contact segments 105–117 which are disposed at equally spaced intervals throughout about 180 degrees of the stator. Accordingly, as the rotor 103 is rotated through the thirteen equal angular positions, and assuming that the rotor has begun to rotate from the position in which it is shown wherein the contact 104*a* is in engagement with the contact 105, during the first 180 degrees of rotation the odd numbered ones of the contact segments 105–117 will be engaged by the tab 104*a* while the tab 104*b* continuously contacts the common arcuate sector 118. Accordingly, the plurality of inductance coils 120, 122, 124, 126, 128, 130 and 131, which are respectively connected between the odd numbered ones of the contact segments 105–117 and ground are selectively connected between ground and an output terminal 135 which is connected to the common sector 118. During the second 180 degrees of rotation of the rotor 102, the contact finger 104*a* continuously rides on the common sector 118 and the contact finger 104*b* selectively engages the even numbered ones of the contact elements 106–116. Accordingly, the inductance coils 121, 123, 125, 127 and 129 are selectively connected between ground and the output terminal 135 during the second 165 degrees of rotation. In the thirteenth position of the rotor 102, the contact segment 116, is connected by the rotor 103 to the terminal 136 and since this is the UHF position the segment 116 is ordinarily not used for connecting an inductance between ground and the terminal 136 but may be used for some other purpose which depends upon the particular circuitry in which the switch 100 is used.

In constructing the switch 100, a single contact stamping including the contact segments 105–117 and the common sector 118, as shown in FIG. 11, is punched out of a metallic sheet and after the individual radially extending contact segments have been staked to the wafer 100, the center portion is punched out. Since the switch 100 does not require the common contact ring 25 on the back side thereof any of the conventional structures for securing the rotor 102 to the stator wafer 101 may be utilized.

While the present invention has been described in connection with particular embodiments of the invention, it will be understood that various modifications may be made thereon which are within the true spirit and scope of the invention as defined in the appended claims.

What is claimed as new and desired to be secured by Letters Patent of the United States is:

1. A method of manufacturing a multiple contact rotary switch, comprising the steps of forming a one-piece metallic stamping having a central portion and a plurality of finger portions extending radially outwardly therefrom and also having a peripheral portion interconnecting the outer ends of said finger portions which is formed to provide a plurality of flexibility hinged inductance members therebetween, securing said stamping to an apertured stator wafer with said central portion thereof positions adjacent said aperture, simultaneously bending predetermined ones of said inductance members out of the plane of said metallic stamping by predetermined amounts to provide inductance couplings of predetermined values between the outer ends of said finger portions, and thereafter severing said finger portions from said central portion, thereby to disconnect said finger portions from one another at one end thereof so as to provide individual contact fingers.

2. A method of manufacturing a multiple contact rotary switch, comprising the steps of forming a one-piece metallic stamping having a central portion and a pluraity of finger portions extending radially outwardly therefrom and also having a peripheral portion interconnecting the outer ends of said finger portions which is formed to provide a plurality of flexibly hinged inductance members therebetween, affixing said stamping to an apertured stator wafer in such manner that said finger portions are individually held in place thereon and said central portion is positioned adjacent said aperture, simultaneously bending predetermined ones of said inductance members out of the plane of said metallic stamping by predetermined amounts thereby simultaneously to provide inductance couplings of predetermined values between the outer ends of said finger portions, and thereafter severing said finger portions from said central portion, thereby to disconnect the inner ends of said finger portions from one another at one end thereof so as to provide individual contact fingers while maintaining the outer ends of said finger portions interconnected through said inductance members.

3. A method of manufacturing a multiple contact rotary switch, which comprises the steps of stamping a metallic sheet to form two groups of radially extending contact arm portions, both of said groups of contact arm portions being connected together at their inner ends by a first interconnecting portion and one of said groups of contact arm portions being connected together at their outer ends by means of a second interconnecting portion, said second interconnecting portion being formed to constitute individual inductances between said second group of contact arm portions which are bendable out of the plane of said metallic sheet, securing said metallic sheet to an apertured stator member in such manner that said contact arm portions of both of said groups are individually secured thereto with said first interconnecting portion positioned so as to be accessible through the aperture in said stator member, severing the inner ends of both groups of said contact arm portions from said first interconnecting portion so that the inner ends of both groups of said contact arm portions are electrically separated from one another while said second group of contact arm portions are electrically connected together through said individual inductances, and bending predetermined ones of said individual inductances simultaneously out of the plane of said metallic sheet to provide inductance couplings of predetermined values between said second group of contact arm portions.

4. A method of manufacturing a multiple contact rotary switch, which comprises the steps of stamping a metallic sheet to form two groups of radially extending contact arm portions, both of said groups of contact arm portions being connected together at their inner ends by a first interconnecting portion and one of said groups of contact arm portions being connected together at their outer ends by means of a second interconnecting portion, said second interconnecting portion being formed to constitute individual inductances between said second group of contact arm portions which are bendable out of the plane of such metallic sheet, securing said metallic sheet to an apertured stator member in such manner that said contact arm portions of both of said groups are individually secured thereto with said first interconnecting portion positioned so as to be accessible through the aperture in said stator member, simultaneously bending predetermined ones of said individual inductances out of the plane of said metallic sheet by predetermined amounts to provide inductance couplings of predetermined values between said second group of contact arm portions, and thereafter severing the inner ends of both groups of said contact arm portions from said first interconnecting portion so that the inner ends of both groups of said contact arm portions are electrically separated one from another while said second group of contact arm portions are electrically connected together through said individual inductances.

References Cited by the Examiner

UNITED STATES PATENTS

| | | | |
|---|---|---|---|
| 1,592,326 | 7/26 | Bastian | 29—155.54 |
| 2,535,686 | 12/50 | Lawrence. | |
| 2,631,211 | 3/53 | Klay | 29—155.55 X |
| 2,864,946 | 12/58 | Achenbach. | |
| 2,870,274 | 1/59 | Thias. | |
| 2,876,314 | 3/59 | Jackson. | |
| 2,944,329 | 7/60 | MacKay | 29—155.55 X |
| 2,944,330 | 7/60 | Swick | 29—155.55 X |
| 2,954,469 | 9/60 | Gelzer | 336—142 X |
| 3,057,047 | 10/62 | Zimmer | 29—155.55 |

WHITMORE A. WILTZ, *Primary Examiner.*

JOHN F. CAMPBELL, *Examiner.*

UNITED STATES PATENT OFFICE
CERTIFICATE OF CORRECTION

Patent No. 3,214,826 November 2, 1965

Alarico A. Valdettaro et al.

It is hereby certified that error appears in the above numbered patent requiring correction and that the said Letters Patent should read as corrected below.

Column 5, line 44, for "flexibility" read -- flexibly --; line 47, for "positions" read -- positioned --.

Signed and sealed this 20th day of September 1966.

(SEAL)
Attest:

ERNEST W. SWIDER
Attesting Officer

EDWARD J. BRENNER
Commissioner of Patents